Figure 1:
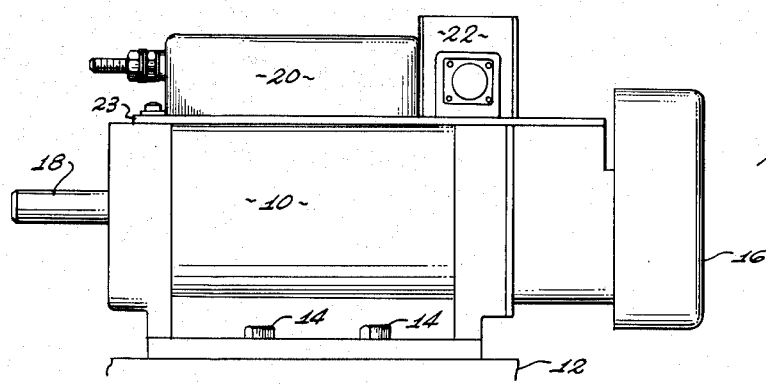

Nov. 30, 1965    V. A. HOOVER    3,221,173
ELECTRICAL CIRCUIT CONTROL FOR MOTOR-GENERATOR
Filed June 8, 1962

INVENTOR.
VAINO A. HOOVER
BY
ATTORNEYS

United States Patent Office 3,221,173
Patented Nov. 30, 1965

3,221,173
ELECTRICAL CIRCUIT CONTROL FOR
MOTOR-GENERATOR
Vaino A. Hoover, 2100 S. Stoner Ave.,
Los Angeles 25, Calif.
Filed June 8, 1962. Ser. No. 214,438
3 Claims. (Cl. 290—31)

My invention relates generally to direct current machines, and more particularly to unique means to facilitate use of a direct current machine for both motor and generator operation with minimum filter apparatus.

A direct current machine which is used as a motor and/or generator in aircraft, for example, must have suitable filters in the leads in circuit with the power lines of the aircraft in order to prevent radio interference noise, i.e., to prevent interaction between the machine and electronic apparatus. Also, such filters are relatively complex and bulky.

A direct current machine which is to be used both for motor operation and generator operation as, for example, a starter motor and then as a generator after the engine has been started, requires suitable switching means for altering circuit connections to adapt the direct current machine for both modes of operation. A number of leads are, of course, required to connect the switching means which are normally manually operated to the direct current machine, and such leads require respective filters to prevent radio interference noise.

As is well known, filters for minimizing noise from motor-generator control circuits occupy a considerable portion of the weight of the motor/generator assembly, e.g., as much as 20%. Also, due to the number, size and complex arrangement of components therein, such filters represent an undesirably large fraction of the total weight of the motor/generator assembly. As is apparent, such filter arrangements are undesirable where weight and space must be kept to a minimum. Nevertheless, because of the need to eliminate noise, the use of a number of such filters has had to be tolerated.

It is an object of my invention to provide an electrical circuit including a single direct current machine which can operate satisfactorily as a motor and as a generator, and which uses a minimum of switching and filter apparatus.

Another object of this invention is to provide an electrical circuit including a single machine which can operate automatically as a motor or generator without the need for switching means to alter circuit connections.

A further object of my invention is to provide for a single direct current machine capable of both motor operation and generator operation, electrical circuit means requiring only a single radio noise filter, thereby to provide an assembly that is smaller and lighter in weight than prior art apparatus of this type.

A still further object of this invention is to provide an electrical circuit including a single direct current machine capable of both motor and generator operation wherein automatic voltage regulated generator operation can be obtained.

Another object of the invention is to provide a machine operable as a motor or generator in an assembly having a minimum number of parts of simple design and rugged construction, which is compact and light in weight, and which is highly reliable.

Figure 2:
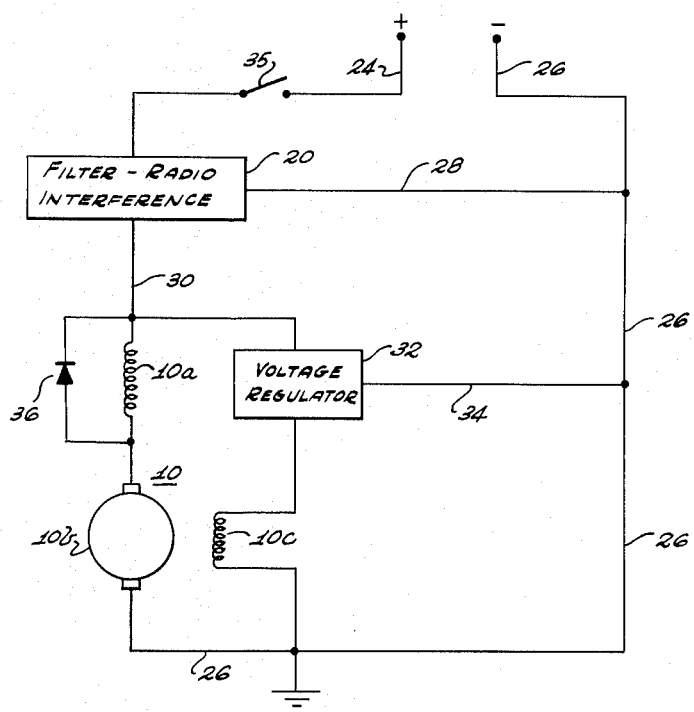

The above and other objects and advantages of my invention will become apparent from the following detailed description taken in conjunction with the accompanying drawing of an illustrative embodiment thereof, in which:

FIGURE 1 is a side elevation view of a machine operable as a motor or a generator, showing the appearance and relative dimensions of the machine and the single radio interference filter used therewith in accordance with my invention; and FIGURE 2 is a circuit diagram of a control circuit of my invention for the machine of FIGURE 1.

FIGURE 1 shows a direct current machine 10, which is suitably mounted on a base 12, as indicated by bolts 14. The machine 10 has a cooling fan (not shown) in a shroud 16 at one end, and its output shaft 18 extends past the other end. A single radio interference filter 20 and a distribution box 22 containing the control network of my invention are mounted on the machine 10, as on a bracket 23 secured to its housing.

To show the significance of the assembly shown in FIGURE 1, it should be noted that two or more filters, like the filter 20, are normally used with machines of the type adapted to operate as a motor or a generator. A single filter of this type normally comprises roughly 20% of the total weight of the assembly shown in FIGURE 1. Thus, it is apparent that if additional radio interference filters were used for the direct current machine 10, the total weight of the assembly would be quite large, and possibly too prohibitive for use in many types of aircraft.

FIGURE 2 shows a circuit diagram of an electrical circuit of my invention for permitting the single filter 20 to be used. A lead 24 is indicated as connected to a positive power bus bar and a grounded lead 26 is indicated as connected to a negative power bus bar. Storage batteries (not shown) are, of course, normally connected to the power bus bars.

The lead 24 is connected to the radio interference filter 20 which is connected to the ground lead 26 by means of lead 28. The radio interference filter 20 is also connected by a lead 30 to one end of the series field coil 10a of the direct current machine, the other end of the coil 10a being connected to the ground lead 26 through the armature 10b of the direct current machine 10. The filter 20, as mentioned previously, is a conventional radio noise filter, and comprises a complex arrangement of resistive, capacitive and inductive elements.

The lead 30 is also coupled to the shunt field 10c of the direct current machine 10 through a voltage regulator 32. The shunt field 10c is grounded as shown, and the voltage regulator 32 is connected to the ground lead 26 by means of a lead 34. The voltage regulator 32 may be a conventional one that includes a relay (not shown) having its control coil connected between leads 30 and 34. The normally closed relay contacts connecting the lead 30 to the shunt field 10c are opened when the voltage on the lead 30 rises above a predetermined value. The relay contacts normally shunt a resistor (not shown) so that when the relay is energized by a sufficiently high voltage from the armature 10b and appearing on the lead 30, a resistor is inserted in series with the shunt field 10c to reduce the output voltage of the direct current machine 10. Of course, the voltage regulator 32 need not be a relay type voltage regulator, but may be a transistor type voltage regulator.

A unidirectionally conductive electronic switching device, shown as diode 36, is connected across the series field 10a of the direct current machine 10, as shown in FIGURE 2. The diode 36, as connected in the circuit of FIGURE 2, makes possible the use of a single radio noise filter 20 that is connected to one common bus bar for both motor and generator operation of the direct current machine 10. The additional leads heretofore required by switching means for adapting a machine for both motor and generator operation are avoided. Further, since a switching means is not required in this circuit, manual switching means involving moving parts is avoided for greater reliability. Automatic operation of the direct current machine 10, as a motor and as a generator, is also obtained.

Operation of the electrical circuit shown in FIGURE 2 is entirely automatic. By closing a suitable switch 35 so that the lead 24 is connected to a positive power bus bar, the direct current machine 10 is energized to operate as a starter motor, as for starting an engine. Power is supplied through the filter 20 to the series field 10a and armature 10b of the direct current machine 10, and also to the shunt field 10c through the normally closed contacts of the voltage regulator 32. The voltage on lead 24 is, for example, 27 volts, and this is passed through the filter 20 as a positive voltage. As shown, the diode 36 is arranged so that it does not conduct when the lead 30 is more positive than the armature end of the coil 10a. The voltage regulator 32 is set to operate at a predetermined voltage which is slightly higher than the normal bus bar voltage on lead 24. Consequently, the direct current machine 10 operates as a compound motor to start the engine.

After the engine has been started, the armature 10b of the direct current machine 10 may be driven by the engine. The direct current machine 10 then operates as a generator. Where storage batteries constitute the power source, the nominal output voltage of the direct current mcahine 10 acting as a generator can be equal to the voltage on the power bus bar, so that when the battery voltage drops below the output voltage of the direct current machine 10, acting as a generator, current is supplied through the diode 36, the lead 30, the filter 20, and the lead 24, thereby to charge the batteries. When the voltage on lead 30 is equal to the desired output voltage from the armature 10b of the direct current machine 10, the voltage regulator becomes active to limit the battery charging current and generated voltage.

If the output voltage of the armature 10b of the direct current machine 10, acting as a generator, is greater than a predetermined voltage which can be slightly higher than the normal bus bar voltage of the aircraft, the voltage regulator 32 is set to operate and insert a resistance in series with the shunt field 10c so as to reduce the generated output voltage from the armature 10b. Thus, the output voltage from the armature 10b of the direct current machine 10, acting as a generator, bypasses the series field 10a by means of the unidirectional conducting device 36. Thus, for motor operation of the direct current machine 10, current passes through the series field 10a to the armature 10b, whereas when the direct current machine 10 operates as a generator, charging current from the armature 10b automatically bypasses the series field 10a by way of the diode 36; thus current through the series field which would produce a magnetizing effect opposed to the shunt field is obviated.

Thus, in the electrical circuit of FIGURE 2, manually operated switching means is not required to adapt the direct current machine 10 for both motor and generator operation, so that additional leads connecting the machine with the switching means is not required, and a single radio noise filter 20 can be used for both motor operation and generator operation. The single filter 20 in the circuit shown in FIGURE 2 is also adequate to service generator operation wherein the output voltage is regulated. It should be noted in this connection that, in prior art circuits, line filters or radio interference filters are additionally and separately required in the voltage regulator and the shunt field circuit.

Instead of serving as a starter motor and generator in an aircraft, the direct current machine 10 can be, for example, a hoist motor for raising heavy loads. On lowering a load, the motor acts as a generator and returns energy to the power system to provide regenerative braking. It is noted that the motor is rotated in an opposite direction on lowering a load, than on raising one. The unidirectional conducting device 36 shunts out the series field 10a so that an excessively dropping output armature voltage with increasing load curent, due to the series field, can be avoided.

It is to be understood that the particular embodiment of my invention described above and shown in the drawings is merely illustrative of, and not restrictive of the broad invention, and that various changes in design, structure and arrangement may be made without departing from the spirit and scope of the invention. For example, the diode 36 can be replaced with a suitably connected transistor operating as a closed switch when the output voltage of the armature 10b is sufficiently positive relative to the voltage on the lead 30. Accordingly, I do not intend that my invention be limited, except as by the appended claims.

I claim:

1. An electrical circuit, comprising: a direct current machine having an armature, series field and shunt field, said direct current machine being adapted to be connected across a set of conductors and to have two modes of operation, one as a motor receiving current from said conductors and the other as a generator delivering current to said conductors; a filter connected across said set of conductors and to said series field; and a unidirectionally conductive device connected across said series field, said device being conductive when said direct current machine operates as a generator delivering current to said conductors.

2. An electrical circuit, comprising: a direct current machine having an armature, series field and shunt field, said series field being connected in series with said armature in a series combination, said shunt field being connected in parallel with said series combination; first and second terminals adapted to be connected to respective external conductors; a filter having an input connected to said first and second terminals, and an output connected to said series combination; and a unidirectional conductive device connected in parallel with said series field and oriented such that it is non-conductive whereby said direct current machine automatically operates as a compound motor when drawing power through said first and second terminals and such that it is conductive whereby said machine automatically operates as a shunt generator when delivering power through said first and second terminals.

3. An electrical circuit, comprising: a direct current machine having an armature, series field and shunt field, said series field being connected in series with said armature in a series combination, and one end of said shunt field being connected to the armature end of said series combination; first and second terminals adapted to be connected to respective conductors; a filter having an input connected to said first and second terminals and an output connected to said series combination; a voltage regulator having an input connected to the output of said filter and an output connected to said shunt field; and a unidirectional conducting device connected in parallel with said series field and oriented such that it is non-conductive whereby said direct current machine automatically operates as a compound motor when drawing power through said first and second terminals and such that it is conductive whereby said machine automatically operates as a shunt generator having a voltage regulated output when delivering power through said first and second terminals.

References Cited by the Examiner

UNITED STATES PATENTS

| | | | |
|---|---|---|---|
| 2,428,202 | 9/1947 | Clapp | 318—251 |
| 2,665,402 | 1/1954 | Clark | 318—252 |
| 2,968,754 | 1/1961 | Gould et al. | 318—376 |

ORIS L. RADER, *Primary Examiner.*